United States Patent [19]

Vassa (Suratano Thienphropa)

[11] Patent Number: 5,421,538
[45] Date of Patent: Jun. 6, 1995

[54] VTOL AIRCRAFT

[76] Inventor: John Vassa (Suratano Thienphropa), 5293 Fountain Ave., Los Angeles, Calif. 90029

[21] Appl. No.: 180,927

[22] Filed: Jan. 12, 1994

Related U.S. Application Data

[63] Continuation of Ser. No. 129,458, Sep. 29, 1993, abandoned.

[51] Int. Cl.⁶ .................. B64C 11/00; B64C 11/48
[52] U.S. Cl. .................... 244/12.2; 244/8; 244/12.5; 244/23 B; 244/23 D; 244/100 R
[58] Field of Search .......... 244/8, 12.2, 12.4, 12.5, 244/12.6, 23 B, 23 C, 23 D, 49, 56, 100 R

[56] References Cited

U.S. PATENT DOCUMENTS

| | | | |
|---|---|---|---|
| D. 137,661 | 4/1944 | Sheffield | 244/49 |
| 204,728 | 6/1878 | Heskins | 244/8 |
| D. 277,116 | 1/1985 | Vassa | 244/49 |
| 2,216,080 | 9/1940 | Johnson . | |
| 2,863,621 | 12/1958 | Davis . | |
| 2,953,320 | 9/1960 | Perry . | |
| 2,966,318 | 12/1960 | Choden . | |
| 2,980,365 | 4/1961 | Yohe . | |
| 3,002,709 | 10/1961 | Cochran | 244/12.2 |
| 3,041,009 | 6/1962 | Wharton . | |
| 3,064,925 | 11/1962 | Preston . | |
| 3,083,934 | 4/1963 | Vanderlip . | |
| 3,127,093 | 3/1964 | Sudrow | 244/23 C |
| 3,432,120 | 3/1966 | Guerrero . | |
| 3,456,902 | 7/1969 | Visconti . | |
| 3,489,374 | 1/1970 | Morcom . | |
| 3,525,484 | 8/1970 | Mueller . | |
| 3,640,485 | 2/1972 | Mutruy | 244/12.2 |
| 3,985,320 | 10/1976 | Brady | 244/12.2 |
| 4,120,468 | 10/1978 | Fischer . | |
| 4,159,086 | 6/1979 | Schonfelder | 244/49 |
| 4,185,826 | 1/1980 | Ueng | 244/12.2 |
| 4,196,877 | 4/1980 | Mutrey | 244/12.2 |
| 4,307,856 | 12/1981 | Walker | 244/12.2 |
| 4,387,867 | 7/1983 | Jordan | 244/12.2 |
| 4,461,436 | 7/1984 | Messina . | |
| 4,469,294 | 9/1984 | Clifton | 244/8 |
| 4,773,618 | 9/1988 | Ow | 244/23 C |
| 5,035,377 | 7/1991 | Buchelt | 244/12.1 |
| 5,046,685 | 9/1991 | Bose | 244/12.2 |
| 5,150,857 | 9/1992 | Moffitt et al. | 244/12.2 |
| 5,295,643 | 3/1994 | Ebbert et al. | 244/12.2 |

Primary Examiner—Andres Kashnikow
Assistant Examiner—Virna Lissi Mojica
Attorney, Agent, or Firm—Jones, Day, Reavis & Pogue

[57] ABSTRACT

A vertical takeoff and landing heavier-than-air aircraft that includes a gyroscopic airfoil in the airstream of a ducted fan to cause vertical lift to the aircraft. The gyroscopic foil is both rotatably and pivotally attached to the aircraft such that it can be tilted to provide directional control of the aircraft and, in at least one embodiment, has an adjustable airfoil forming part of the gyroscopic device such that the lift can be varied.

13 Claims, 5 Drawing Sheets

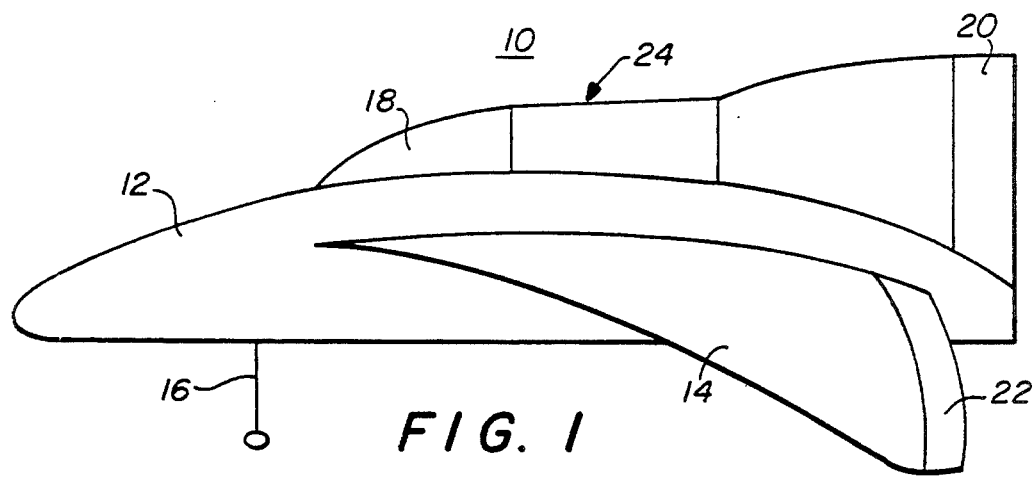
FIG. 1
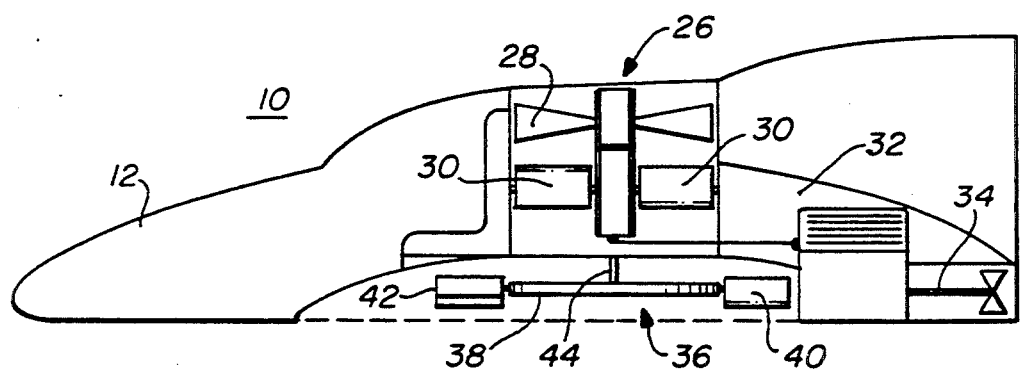
FIG. 2
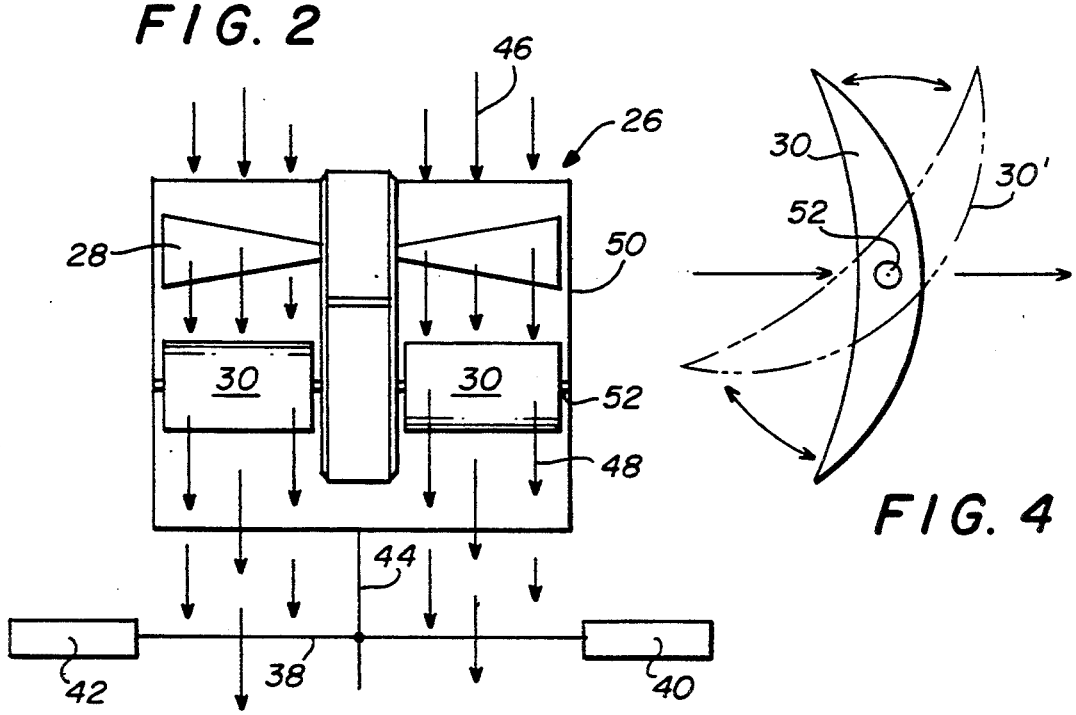
FIG. 3
FIG. 4

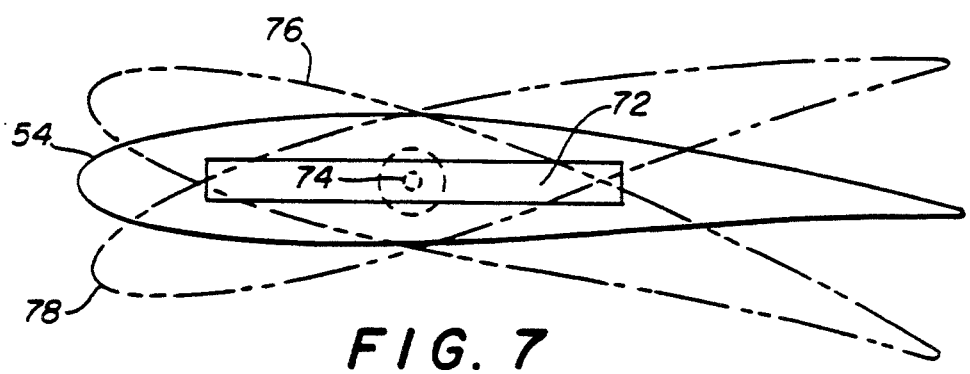
FIG. 7
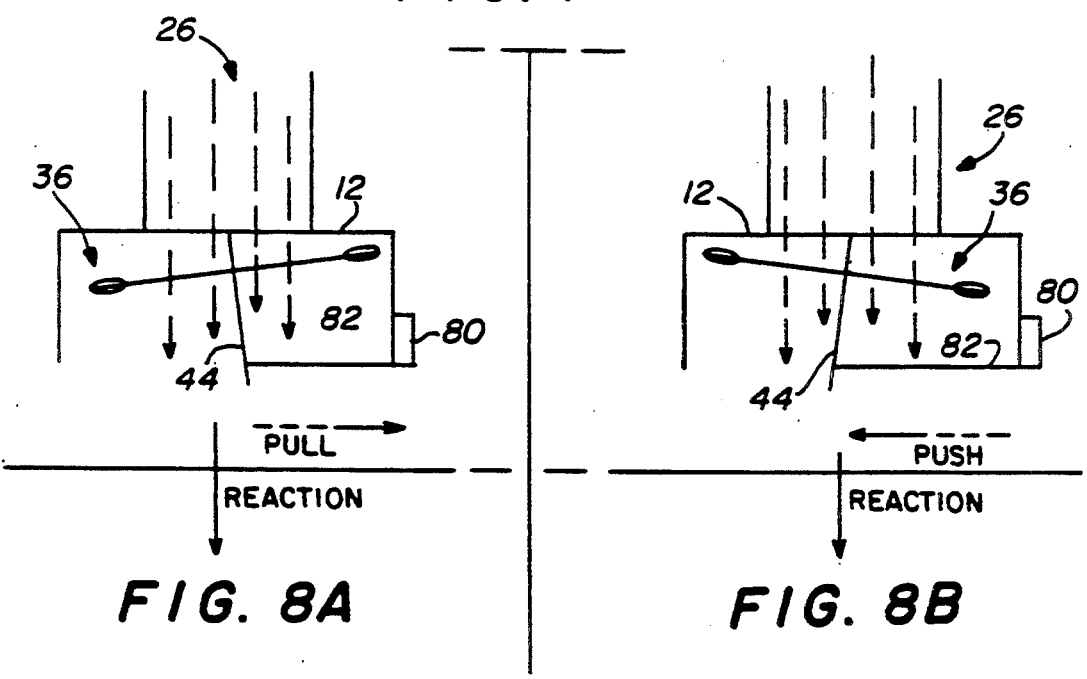
FIG. 8A
FIG. 8B

VTOL AIRCRAFT

CROSS-REFERENCE TO RELATED APPLICATION

This is a continuation of application Ser. No. 08/129,458 filed Sep. 29, 1993, now abandoned.

BACKGROUND OF THE INVENTION

1. Field of the Invention

The present invention relates in general to a vertical takeoff and landing heavier-than-air aircraft and specifically to a vertical takeoff and landing aircraft that has a gyroscopic propeller device rotatably and pivotally attached to the fuselage of the aircraft for rotation about a vertical axis such that the propeller device is rotated by the thrust from a power source to provide additional lift, gyroscopic stability, and direction to the aircraft.

2. Description of Related Art

There are many different types of vertical takeoff and landing aircraft (VTOL). Some of them, such as disclosed in U.S. Pat. No. 4,461,436, use a ducted fan engine to provide the lift. In addition, stability is provided to the aircraft by an internal gyrorotor containing fin-like spokes which drive the rotor when placed in the airflow from the propeller. This craft is a model of a flying saucer and, to provide it with stability, a gyroscopic rotor is placed within the craft to be driven by the thrusts from the ducted fan and provide gyroscopic stability to the craft.

Such craft is provided with lift only by the thrusts from the ducted fan and is controlled by stator vanes mounted in the ducted fan to provide an adjustable countertorque for controlling the aircraft in yaw. The propeller of the ducted fan provides sufficient thrust to cause the craft to hover or climb. The airflow from the propeller also impinges on fin-shaped spokes that cause a gyrorotor to revolve and provide stabilization to the craft. Beneath the gyrorotor are counterrotational fins that are set at an angle to provide sufficient counterrotational force when the propeller thrust impinges on them to maintain the craft stationary. The counterrotational fins may have an airfoil cross section to provide additional lift.

Such craft is actually only a model and does not carry humans. Even so, it does not have wing surfaces and thus must be flown in the manner of a helicopter.

SUMMARY OF THE INVENTION

It would be advantageous to have an aircraft that would carry an individual, have wings, have vertical takeoff and landing capabilities as well as the normal forward flight with wings that would have gyroscopic stability when in the VTOL mode and that would provide additional lift and direction to the aircraft.

The present invention discloses a vertical takeoff and landing heavier-than-air aircraft comprising a fuselage with a ducted fan driven by an engine in the fuselage. the aircraft also has a power source driven by the engine for conventional forward flight. The ducted fan is arranged to rotate about a vertical axis for providing thrust to the aircraft for vertical takeoff and landing. During the flight of the aircraft, as a VTOL aircraft, it is controlled in yaw with stator vanes pivotally mounted in the ducted fan to receive the thrust and provide an adjustable countertorque. A gyroscopic propeller device is rotatably and pivotally attached to the fuselage of the aircraft for rotation about a vertical axis. The propeller device is rotated by the thrust from the ducted fan to provide additional lift, gyroscopic stability, and direction control to the aircraft. The gyroscopic propeller device in the present invention provides not only gyroscopic stability but also has an airfoil shape to provide additional lift and is mounted to the fuselage in a pivotable manner so as to provide direction control to the aircraft. In addition, in various embodiments, the gyroscopic propeller device has adjustable wing-like lift surfaces formed thereon to control the amount of lift provided to the aircraft. When the aircraft is used as a conventional aircraft, it is controlled in pitch, yaw, and roll in the conventional manner.

Thus, it is an object of the present invention to provide a VTOL heavier-than-air aircraft that has a device rotated by the thrust from a ducted fan which creates gyroscopic inertia to stabilize the aircraft.

It is also an object of the present invention to provide a VTOL heavier-than-air aircraft that has a gyroscopic propeller device driven by the thrust from a ducted fan and which not only creates gyroscopic inertia to the aircraft but also produces secondary lift that is controllable in magnitude.

It is yet another object of the present invention to provide a VTOL heavier-than-air aircraft that has wing-like surfaces on the sides thereof that can be tilted from substantially the horizontal plane to a downward angle for supporting the aircraft when it rests on a ground surface.

It is still another object of the present invention to provide a VTOL heavier-than-air aircraft that has wing-like lift surfaces on each side thereof and that has conventional thrust at the rear of the airplane to provide forward movement when necessary including when in the air.

It is yet another object of the present invention to provide a VTOL heavier-than-air aircraft that has wing-like lift surfaces, typical rearward-directed thrust for forward motion, and a gyroscopic device for not only stabilizing the aircraft but also providing directional control to the aircraft.

Thus the invention relates to a vertical takeoff and landing heavier-than-air aircraft comprising a fuselage, an engine in the fuselage arranged to apply thrust to the aircraft necessary for vertical takeoff and landing and a gyroscopic propeller device rotatably, pivotably, and tiltably attached along a vertical axis to the fuselage of the aircraft, the propeller device being rotated by the thrust from the engine thereby providing additional lift, gyroscopic stability, and direction control to the aircraft.

BRIEF DESCRIPTION OF THE DRAWINGS

These and other objects of the present invention will be more fully disclosed in the following DETAILED DESCRIPTION OF THE DRAWINGS in which:

FIG. 1 is a diagrammatic representation of a side view of the aircraft;

FIG. 2 is a cutaway side view schematic representation of the aircraft illustrated in FIG. 1 showing the ducted fan, the gyroscopic propeller device, the engine, and the propulsion means at the rear of the aircraft;

FIG. 3 is a schematic representation of the ducted fan illustrating the adjustable stators therein for providing a counterrotational force to the ducted fan and for providing control of the aircraft in yaw;

FIG. 4 is a schematic representation of the airfoil shape of the adjustable stators showing the adjustable movement from a first position to a second position to illustrate control of the aircraft in yaw;

FIG. 7 is an end view of one of the four lift surfaces in FIG. 6 illustrating the airfoil shape, a compartment for placing a weighting material such as lead to provide gyroscopic stability and illustrating in dashed lines how the airfoil may be adjusted in pitch to obtain more or less control of additional lift;

FIG. 8A and 8B illustrate the tilting of the gyro to cause a resultant motion of the aircraft in two directions;

DETAILED DESCRIPTION OF THE DRAWINGS

Figure 5A:
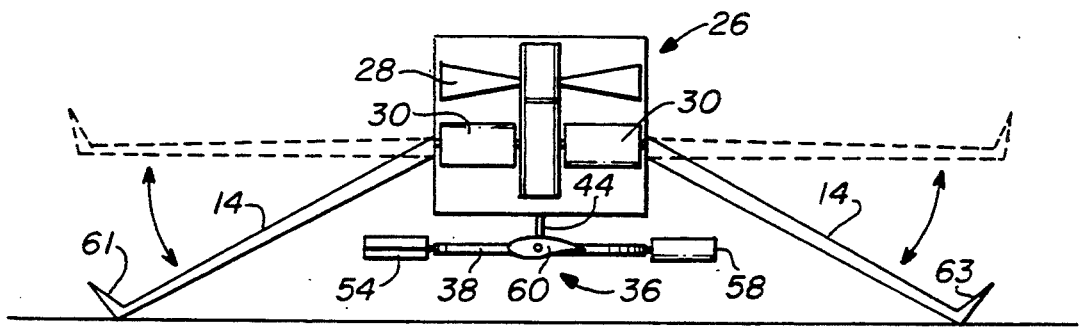
FIG. 5A is a schematic illustration of a front view of the aircraft illustrating tiltable wings that pivot from substantially the horizontal to an angle with the vertical to provide landing support for the aircraft and illustrating a gyrofoil not only for stabilizing the aircraft but also having controllable lift surfaces on the outer end thereof to determine the amount of additional lift provided.

FIG. 1 is a side view of a diagrammatic representation of the VTOL aircraft of the present invention. The aircraft 10 includes a fuselage 12, lift surfaces 14 that, as will be described in more detail hereafter, pivot downwardly to cause the outer ends thereof to touch a surface on which the aircraft 10 rests and thus provide a support for it. It also has a forward landing gear 16, cockpit 18, control surfaces 20 and 22, as needed, and a ducted fan inlet 24.

FIG. 2 discloses a side view of the VTOL aircraft 10 in partial cutaway to illustrate the ducted fan 26 that includes a propeller 28 and adjustable stators 30. The propeller 28 is driven by an engine 32 and the propeller blades 28 are so constructed that air is pulled in through the top of the ducted fan and expelled at the bottom to create lift in a well-known manner. Adjustable stators 30 are provided within the airstream created by the propeller 28 and are adjustable in angle as is well known in the art to control the yaw or azimuth of the aircraft. An additional power source 34 of any well-known type such as a ducted fan may be driven by engine 32 to provide forward thrust of the aircraft 10 as needed. A gyroscopic propeller device 36, hereafter denoted a gyrofoil, is pivotally mounted to the fuselage 12 of the aircraft 10 such that it has an axis of rotation in axial alignment to the axis of rotation of the propeller 28 of the ducted fan 26. The gyrofoil 36 has at least one propeller-shaped blade 37 (see FIG. 6) encircled at the outer ends thereof by a ring 38. Attached to the outer ends of the ring in axial alignment with the propeller shaft 37 are lift surfaces or airfoils 40 and 42. As will be seen hereafter, these airfoils 40 and 42 may be made to have variable pitch thereby changing the amount of lift generated by them. As propeller 28 of the ducted fan 26 rotates, it pulls air in through the top of the fuselage and forces it out at the bottom. Because the propeller 37 is in the airstream, it rotates. As it rotates, it creates a gyroscopic effect because of the lift surfaces 40 and 42 on the outer ends thereof and because of the ring 38. Thus, the aircraft 10 is stabilized by the gyroscopic effect of the gyrofoil 36. In addition, the propeller blade 37 may be shaped such that it rotates in an opposite direction to the rotation of propeller 28 in the ducted fan 26 thereby providing a counterrotation force. Further, because the gyrofoil 36 is pivotally attached to the aircraft frame 12 with rod 44, it can be tilted to cause direction of movement of the aircraft to change as will be discussed in greater in detail hereafter.

Thus the VTOL aircraft 10 shown in FIG. 2 having gyrofoil 36 provides several advantages. First, it creates gyroscopic inertia to stabilize the aircraft. Second, the airfoils 40 and 42 produce secondary lift. Because the airfoils are capable of being varied in pitch angle, the amount of lift can be varied. Fourth, because it can be tilted, it provides means for controlling the direction of movement of the aircraft. Finally, because the gyrofoil 36 may be caused to rotate in a direction opposite the propeller 28 in ducted fan 26, it provides a counterrotation force thus making it easier to control the aircraft in yaw or azimuth.

FIG. 3 is a more detailed side view of the ducted fan 26 including the propeller 28 and the adjustable stators 30 pivotally mounted to the shroud support 50 by means of adjustable pivots 52. Thus, as propeller or fan 28 rotates, it pulls in the air 46 from the top across the adjustable stators 30 and out the bottom in the direction indicated by arrows 48 to provide lift to the aircraft. The stators 30 are adjustable in any well-known manner as illustrated in FIGS. 2, 3, and 4 to change their relative position in the airflow 48 to provide an adjustable torque. Thus the adjustable stators 30 can be positioned to exactly counterbalance the torque of propeller 28 and hold the aircraft steady or decrease or increase the opposing force to cause the aircraft to change its position in yaw. This operation is well known in the art and need not be discussed in further detail here.

Figure 5B:
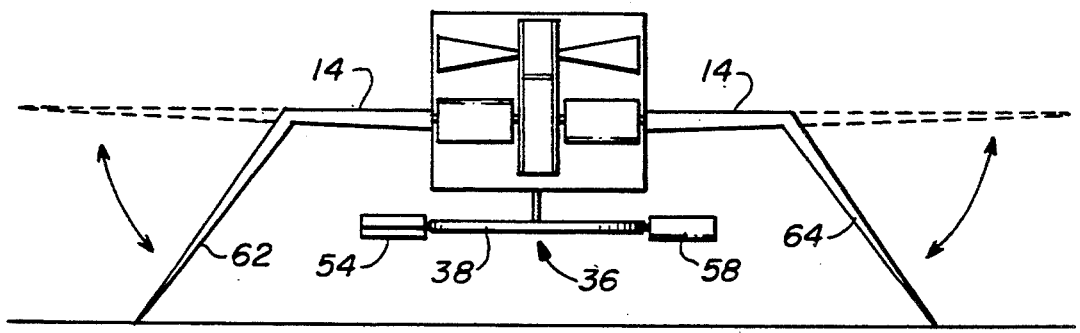
FIG. 5B is a schematic representation of an end view of another embodiment of the aircraft illustrating wing-like lift surfaces on each side of the aircraft that partially fold downwardly to form the landing gear for the aircraft and illustrating a gyrostabilizer having two adjustable lift surfaces thereon for providing additional adjustable lift.

FIG. 5A is a from view of a diagrammatic representation of the aircraft in which the fuselage is illustrated only by the ducted fan 26. It is to be understood, however, that a true front view of the aircraft would be the front view of the aircraft illustrated in FIG. 1 and that the representation illustrated in FIG. 5A and in FIG. 5B is for purposes of clarity only in explaining the operation of the ducted fan and the gyrofoil 36. As can be seen in FIG. 5A, wings 14 are pivotally attached to the aircraft fuselage that include the ducted fan 26 such that they are able to be pivotally moved from the horizontal position as illustrated by the phantom lines to a downwardly angled position as shown in solid lines to provide landing gear support for the aircraft. The outer ends 61 and 63 of the wings 14 could, of course, include retractable wheels so that the aircraft could roll along the ground as a typical aircraft. As shown in FIG. 5A, the gyrofoil 36 includes four airfoils 54, 58, 60, and one, not visible in FIG. 5A, opposite airfoil 60, on the outer ends of transverse propellers 37 not visible but such as one of the propellers shown in FIG. 6. Again, the gyrofoil 36 is rotatably attached to rod 44 which is pivotally attached to the frame of the aircraft 10. The device functions in the manner as previously described with the airfoils 54, 56, 58, and 60 being adjustable in pitch to control the amount of lift contributed to the aircraft.

FIG. 5B discloses an alternate version of the aircraft in which the outer portions 62 and 64 of the wings 14 are pivotable from a horizonal to a downwardly angulared position as shown again to provide support for the aircraft when it is sitting on the ground. In this embodiment only two airfoils 54 and 58 are shown attached to the outer ends of propeller, not shown, on the outside of ring 38 of gyrofoil 36.

Figure 6:
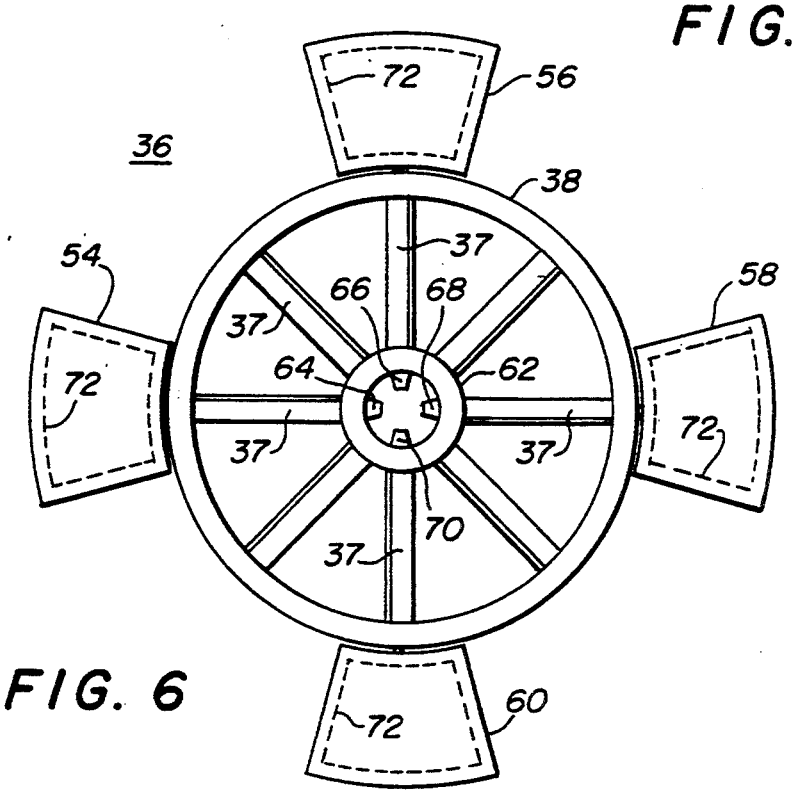
FIG. 6 is a plan view of the gyrorotor illustrated in FIG. 5A illustrating four lift surfaces on the outer end of an annular ring that are adjustable in angle and that provide the controllable lift to the aircraft.

FIG. 6 is a plan view of the gyrofoil 36 illustrated in FIG. 5A. As can be seen in FIG. 6, gyrofoil 36 includes propellers 37 circumscribed by an annular ring 38. Airfoils 54, 56, 58, and 60 are pivotally attached to the gyrofoil 36 in axial alignment with their respective propeller 37. On the interior of inner annular ring 62 are doubled gears 64, 66, 68, and 70 each of which is attached to a shaft, not shown, that extends through the propeller 37 and ring 38 to their respective airfoil 54, 56, 58, and 60. A common bevel ring attached to an elongated shaft extending through shaft 44 shown in FIG. 5A and not shown, commonly mates with the bevel gears 64, 66, 68, and 70 such that all of the four beveled gears may be rotated simultaneously in a well-known manner to pivot the airfoils 54, 56, 58, and 60 in a simultaneous fashion. Thus the lift developed by each of the airfoils may be adjusted through varying the angle of attack of the airfoils. Such adjustment is in a manner well known in the art and thus is not disclosed in any detail here. Each of the airfoils 54, 56, 58, and 60 may include a weight 72 illustrated in phantom lines to increase the gyroscopic effect of the gyrofoil 36.

FIG. 7 is an end view of one of the airfoils 54 illustrating its ability to be tipped upwardly to a position illustrated by phantom line 76 and downwardly as indicated by phantom line 78. Shaft 74 is connected to the beveled gear 64 in FIG. 6 that is driven to allow the airfoil 54 to change pitch as illustrated. The weight for providing increased gyroscopic effect is illustrated by the numeral 72 in FIG. 7. FIGS. 8A and 8B illustrate the directional control of the aircraft by applying pressure to the shaft 44 about which the gyrofoil 36 rotates. As illustrated in FIG. 8A in diagrammatic fashion, if servo 80 is attached to fuselage 12 and servo 80 drives a rod 82 that is connected to the shaft 44 about which the gyrofoil 36 rotates and which is pivotally attached to the fuselage 12, a force can be applied by servo 80 to rod 82 to tend to move the rod 44 about which gyrofoil 36 rotates to the position shown. Thus motion is applied in the direction illustrated by arrow 84.

In like manner, as illustrated in FIG. 8B, if the servo 80 applies pressure to shaft 44 through rod 82 as shown, the motion of the aircraft will be in the direction as indicated by arrow 86. Thus, the direction of the aircraft can be controlled by tilting the gyrofoil 36 as indicated.

Figure 9:
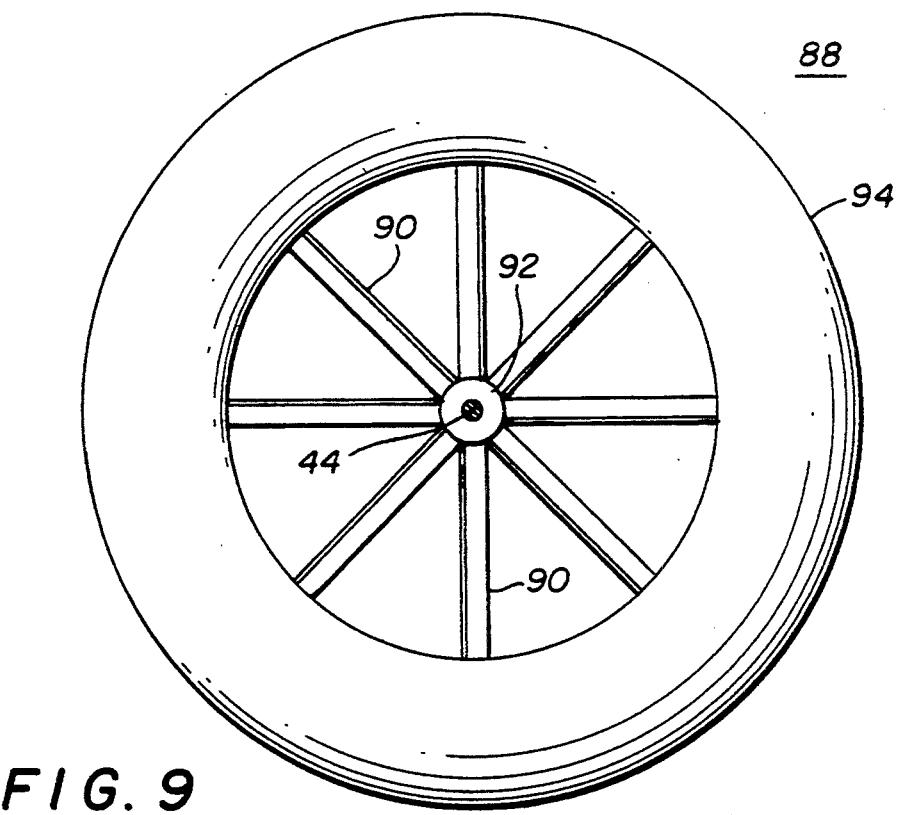
FIG. 9 is an illustration of another embodiment of a gyroscopic propeller device which has an annular airfoil that rotates and provides the additional lift to the aircraft.
Figure 10:
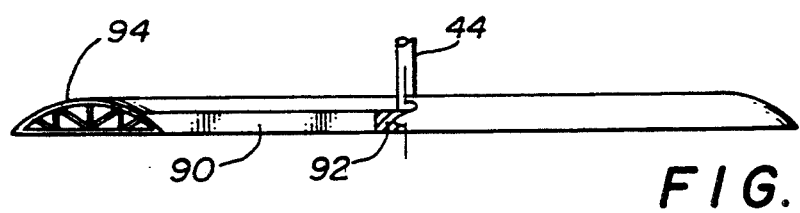
FIG. 10 is a side view of the airfoil of FIG. 9 illustrating the shape of the airfoil.
Figure 11:
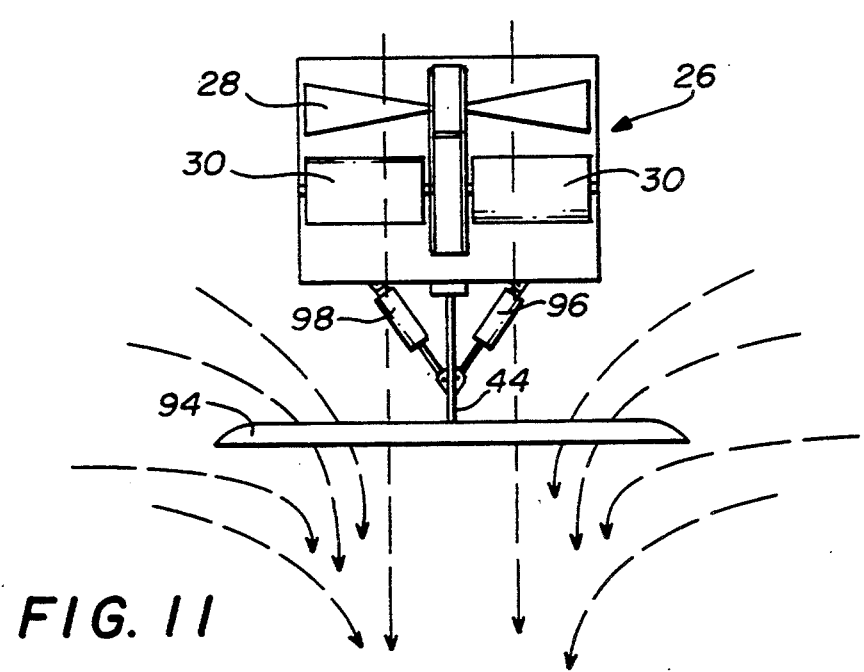
FIG. 11 is a schematic representation of the ducted fan with the tiltable gyroscopic airfoil underneath and illustrating the flow pattern that not only rotates the airfoil but also causes the additional lift as the air moves over the airfoil surfaces.

FIG. 9 is a plan view of an alternate embodiment of a gyrofoil 88. This gyrofoil has the propeller blades 90 attached to the central hub 92 and which are circumscribed about their outer ends by an annular ring 94 which has the shape of a lift surface. Thus the entire annular ring 94 is rotated by the propellers 90 by means of the airstream from the ducted fan as described earlier. This version is illustrated schematically in cross section in FIG. 10 and FIG. 11 illustrates the embodiment of FIG. 9 rotatably attached to vertical rod 44 which is pivotally attached to the frame of the aircraft as described earlier. Thus, as fan or propeller 28 rotates and causes a downward airflow across propellers 90, the annular ring 94 rotates hence providing lift and causing an airflow over the lift surfaces 94 as illustrated in the phantom lines thereby creating lift. As illustrated in FIG. 11, actuators 96 and 98 of any well-known type such as hydraulic actuators are coupled between pivotable shaft 44 and the frame of the aircraft to cause the annular ring or gyrofoil 94 to tilt as explained earlier in relation to FIGS. 8A and 8B.

Figure 12:
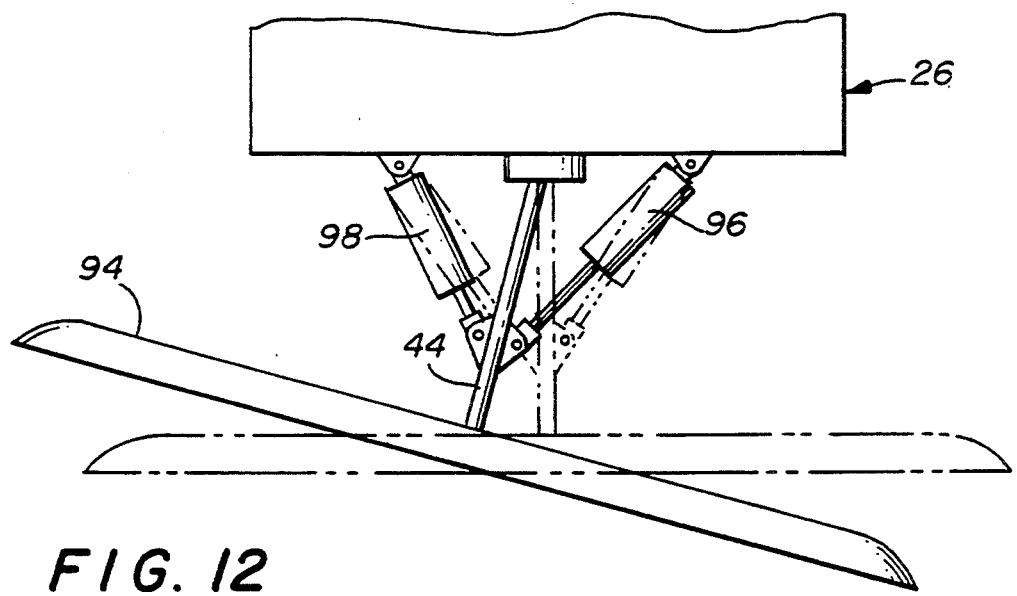
FIG. 12 is a partial view of the ducted fan illustrating the tilting of the gyrofoil to change direction of movement of the craft.

FIG. 12 is a schematic representation of the annular ring or gyrofoil 94 being tilted at an angle by movement of rod 44 to which it is rotatably attached. The method of tilting the gyrofoil is not limited to what is diclosed here. The method of tilting the rotor blades of a conventional helicopter may be used. Again, this motion has been described earlier with respect to previous embodiments in FIGS. 8A and 8B.

Figure 13:
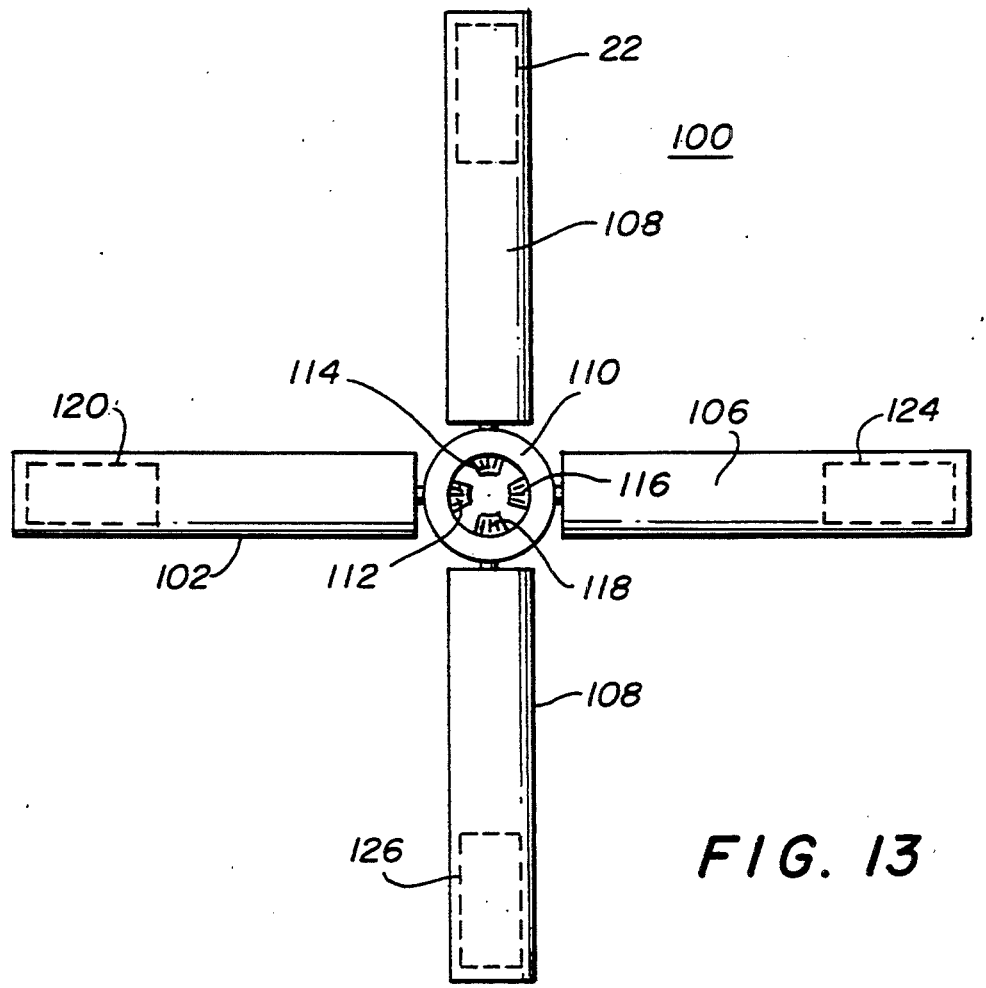
FIG. 13 is a plan view of an alternate embodiment of the gyrofoil having propeller blades with weights inserted in the outer ends thereof to increase the gyroscopic effect.

FIG. 13 is a plan view of an alternate gyrofoil 100. It has four propeller blades 102, 104, 106, and 108 each pivotally mounted to ring 110 through a bearing, not shown. Beveled gears 112, 114, 116, and 118 are coupled to their respective propeller 102, 104, 106, and 108 through a shaft not shown for rotating the respective propeller blades in pitch as described previously. These gears 112, 114, 116, and 118 are beveled gears which mesh with a common beveled gear in a well-known manner such that all four propeller blades are varied in pitch simultaneously by rotation of the common beveled gear. Again, the gyrofoil 100 in FIG. 13 may have increased gyroscopic effect by placing weights 120, 122, 124, and 126 in the respective propeller blades at the outer ends thereof.

Thus, there has been disclosed a novel VTOL heavier than air aircraft that includes a gyrofoil under a ducted fan. The gyrofoil is pivotally connected to the aircraft fuselage to provide means for providing direction to the aircraft and in some embodiments includes adjustable pitch airfoils that provide variable secondary lift. Thus the gyrofoil creates gyroscopic inertia to stabilize the aircraft, produces variable secondary lift, increases the stability of the aircraft, provides means for controlling direction of the aircraft and, by controlling the direction of rotation, provides a counterforce to the rotation of the ducted fan.

Clearly, the principles disclosed herein are applicable to model aircraft that, of course, do not carry individuals. The present application is intended to cover such model aircraft.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A vertical takeoff and landing heavier-than-air aircraft comprising:
   a fuselage;
   a power plant in the fuselage;
   a ducted fan in the fuselage and driven by the engine, the ducted fan being arranged to rotate about a vertical axis with respect to the aircraft for providing thrust to the aircraft for vertical takeoff and landing;
   at least one stator vane pivotally mounted in the aircraft to receive the thrust of the ducted fan and provide an adjustable torque to the ducted fan for controlling the aircraft in yaw; and
   a gyroscopic propeller device rotatably and pivotally attached to the fuselage of the aircraft for rotation about a vertical axis with respect to the aircraft, said propeller device being rotated by the thrust from the ducted fan thereby providing additional lift, gyroscopic stability, and direction to the aircraft.

2. A vertical takeoff and landing heavier-than-air aircraft as in claim 1 further comprising:
   a wing-like lift surface pivotally attached to each side of the fuselage for selective movement in a vertical plane, such that the lift surfaces may serve both as landing pads when pivoted downwardly and as lift surfaces when pivoted upwardly; and
   a controllable force-producing device coupled between the fuselage and the wing-like lift surface on each side of the fuselage to selectively pivot the wing-like lift surfaces between the downward position and the upward position.

3. A vertical takeoff and landing aircraft as in claim 1 further comprising:
   at least one powered actuator coupled between the gyroscopic propeller device and the aircraft fuselage; and
   a control device coupled to the at least one powered actuator such that operation of the control device applies power to the actuator to tend to tilt the gyroscopic propeller device and control the direction of movement of the aircraft.

4. A vertical takeoff and landing aircraft as in claim 3 wherein the gyroscopic propeller device has a plurality of propeller blades thereon that are rotated by the thrust of the ducted fan.

5. A vertical takeoff and landing aircraft as in claim 4 further comprising:
   a circular ring attached to and circumscribing the outer ends of the plurality of propeller blades; and
   at least two wing-like lift surfaces equally spaced about the circumference of the circular ring to provide both lift and gyroscopic stabilization as the propeller device rotates.

6. A vertical takeoff and landing aircraft as in claim 5 further comprising:
   a pivotal arrangement for attaching each of the two or more wing-like lift surfaces to the circular ring in longitudinal alignment with one of the propeller blades; and
   a pitch adjustment device coupled to each of the wing-like lift surfaces for controllably changing the pitch of all of the wing-like lift surfaces equally and simultaneously for changing the amount of lift for a given rotational speed.

7. A vertical takeoff and landing aircraft as in claim 4 further comprising an annular airfoil rigidly attached to and circumscribing the outer ends of the plurality of propeller blades to form a rotating airfoil that provides both lift and gyroscopic stability to the aircraft.

8. A vertical takeoff and landing aircraft as in claim 4 further comprising a weight aerodynamically forming a portion of the outer end of each of the propeller blades to increase the gyroscopic stability of the aircraft.

9. A vertical takeoff and landing aircraft as in claim 1 further comprising a control device coupled to the at least one stator vane for changing the angle thereof to provide the adjustable countertorque and control the yaw of the aircraft.

10. A vertical takeoff and landing aircraft as in claim 4 wherein each of the propeller blades is positioned such that the ducted fan thrust rotates the propeller blades in the opposite direction of the ducted fan to provide a counterrotation stabilizing force to the aircraft.

11. A vertical takeoff and landing aircraft as in claim 1 further including an additional power source in the fuselage for selectively providing thrust with an airstream at the rear of the aircraft such that the additional power source causes the aircraft to move forward as a conventional aircraft.

12. A vertical takeoff and landing aircraft as in claim 11 wherein the additional power source is a second ducted fan arranged to rotate about a horizontal axis with respect to the aircraft fuselage.

13. A vertical takeoff and landing heavier-than-air aircraft comprising:
   a fuselage;
   an engine in the fuselage arranged to provide airstream thrust to the aircraft necessary for vertical takeoff and landing; and
   a gyroscopic propeller device rotatably and pivotally attached along a vertical axis to the fuselage of the aircraft such that the propeller device is rotated by the airstream thrust from the engine thereby providing additional lift, gyroscopic stability, and direction to the aircraft.

* * * * *